Figures 1, 2:
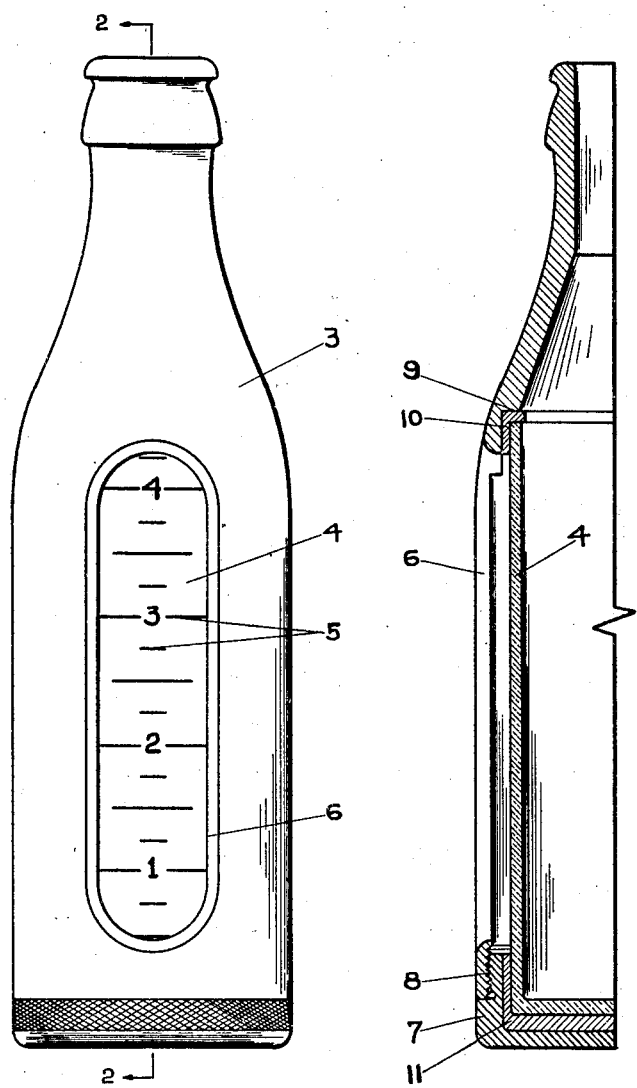

Sept. 4, 1928.

G. J. HUNTLEY

LIQUID GAUGE

Filed Dec. 18, 1926

1,683,191

Inventor
George J. Huntley
By his Attorneys

Patented Sept. 4, 1928.

1,683,191

UNITED STATES PATENT OFFICE.

GEORGE J. HUNTLEY, OF BALTIMORE, MARYLAND, ASSIGNOR, BY MESNE ASSIGNMENTS, TO CROWN CORK & SEAL COMPANY, INC., OF NEW YORK, N. Y., A CORPORATION OF NEW YORK.

LIQUID GAUGE.

Application filed December 18, 1926. Serial No. 155,580.

This invention relates to liquid-measuring devices. More particularly it relates to devices for measuring syrup charges in automatic bottling machines.

In so-called soda machines, bottles are given a charge of syrup and a charge of carbonated water. Syrup delivery devices are known in which predetermined charges of syrup are automatically delivered to successive bottles, the delivery operation being usually controlled by the bottle itself. It sometimes happens, for one reason or another, that the automatic syruping device will not function true to the predetermined quantity. As it is important that the machine deliver the proper amounts of syrup, tests for quantity are frequently made, especially at the start of a run. According to known practice, the attendant removes a bottle at random from the line coming from the syruper and pours the contents into an ordinary glass graduate such as is used by apothecaries. This method is not satisfactory because an accurate measurement is almost impossible due to the somewhat sticky character of the syrup and the possible carelessness of the attendant. If the graduate is applied directly to the syruping device, the test is usually inaccurate for the reason that the charge obtained is the result of conditions unlike those of normal bottle-controlled delivery.

It is an object of the present invention to provide a measuring device capable of accurately testing charges of syrup or other fluid being delivered to containers. More particularly it is an object of the invention to provide such a measuring device that avoids pouring the charge and that receives a charge under conditions identical with normal delivery.

With these general objects in view the invention consists in the features, combinations, details of construction and arrangements of parts which will first be described in connection with the accompanying drawing and then more particularly pointed out.

In the drawing:

Figure 1 is a view in front elevation of a measuring device constructed in accordance with the invention; and Figure 2 is a sectional view taken on the line 2—2 of Fig. 1.

Referring to the drawing, the measuring device includes an outer shell of the size and shape of the containers to be filled. The present drawing shows a bottle-shaped shell 3, being designed for testing ordinary bottles used for packaging common soda drinks. The shell 3 has the outer shape and size of the particular run of bottles for which tests are to be made.

Within the shell is a transparent measuring cup 4 bearing measuring indicia. The cup here shown as an example is made of glass and has graduation marks 5 which may, for example, indicate ounces.

The shell 3 is formed of non-breakable material, for example, metal. In order to render the graduated cup and its contents visible for reading, the shell wall has one or more cut-outs. As shown, the shell 3 has oppositely disposed elongated openings 6 of sufficient size to expose the graduate marks of the cup.

The shell is arranged for ready insertion of the measuring cup and for removal thereof when necessary. To this end, as here shown as an example, the shell has a removable bottom cap or closure 7, having a screw-threaded flange 8 which threads into the lower threaded end of the shell wall.

There is provided means for yieldingly supporting the glass cup in the shell. As here shown as an example, the shell has an internal shoulder 9 in which fits a flanged gasket 10 of rubber or other yieldable material. When the cup is in place, its top rim engages this gasket. Embraced within the bottom closure 7 is a cup-shaped gasket 11 of similar material, in which the bottom of the cup is received. When the closure 7 is screwed into place, the cup is clamped between these upper and lower gaskets, thus being supported in a manner to prevent breakage.

When it is desired to test syrup charges, the measuring device above described is substituted for a bottle in the line being fed to the syruper. It is thus presented to the syruper just like any of the bottles being filled and receives a charge of syrup under conditions identical with those governing normal delivery. It is then removed from the line of bottles and a test reading made.

With the device described a true test is obtainable in a simple manner, as the inaccuracies due to pouring into a graduate are avoided and the charge read is obtained under conditions identical with those of normal bottle filling. Further, the device is capable of withstanding ordinary rough usage in a bottling plant without breakage.

While the device has been described in connection with the measurement of syrup charges in filling machines, it will be understood that it is capable of other uses.

What is claimed is:

1. A measuring device, for use in testing charges delivered by packaging machines, comprising an outer non-breakable shell of the size and shape of the containers to be filled, and an inner transparent measuring cup, the shell being cut away to render the cup and its contents visible for reading.

2. A measuring device, for use in testing charges delivered by packaging machines, comprising a bottle-shaped, non-breakable shell of the size of bottles to be filled, a graduated glass measuring cup within the shell, the shell being cut away to render the cup and its contents visible for reading, and means for yieldingly supporting the cup in the shell.

3. A measuring device, for use in testing charges delivered by packaging machines, comprising an outer non-breakable shell of the size and shape of the containers to be filled, an inner transparent measuring cup, the shell being cut away to render the cup and its contents visible for reading, a removable bottom closure for the shell, and upper and lower gaskets between which the cup is clamped when the closure is in place.

In testimony whereof, I have hereunto set my hand.

GEORGE J. HUNTLEY.